United States Patent [19]
Kurek

[11] 3,970,525
[45] July 20, 1976

[54] ATMOSPHERIC EFFECTS STILL

[76] Inventor: John A. Kurek, 138 James St., Buffalo, N.Y. 14210

[22] Filed: Nov. 27, 1974

[21] Appl. No.: 524,244

[52] U.S. Cl. .......................... 202/174; 203/DIG. 1; 202/187; 202/185 B; 159/18
[51] Int. Cl.² .......................................... B01D 3/02
[58] Field of Search ........... 202/174, 158, 185, 186, 202/187, 189, 161, 234; 203/DIG. 1, 10

[56] References Cited
UNITED STATES PATENTS

| | | | |
|---|---|---|---|
| 3,015,613 | 1/1962 | Edmondson | 202/234 X |
| 3,232,846 | 2/1966 | Kimmerle | 202/185 |

Primary Examiner—James M. Tayman, Jr.
Attorney, Agent, or Firm—Sommer & Sommer

[57] ABSTRACT

An atmospheric effects still includes a fluid holding tank provided with a supply opening, a top cover of transparent material supported above the tank, and a vertically-disposed tapered hollow tower member having its base resting on the floor of the tank and having an intermediate portion penetrating the top cover. At its base, the tower member has openings in its side walls to permit fluid entry into the tower member beneath the top cover. The tower member has a plurality of vertically-spaced sections of decreasing cross-sectional area, each section including a plurality of short, open tube members extending through two spaced plates. Solar energy heats fluid in the tank and causes a flow of moisture-laden air to rise upwardly through the tower member where clean water is condensed from such vapor.

1 Claim, 3 Drawing Figures

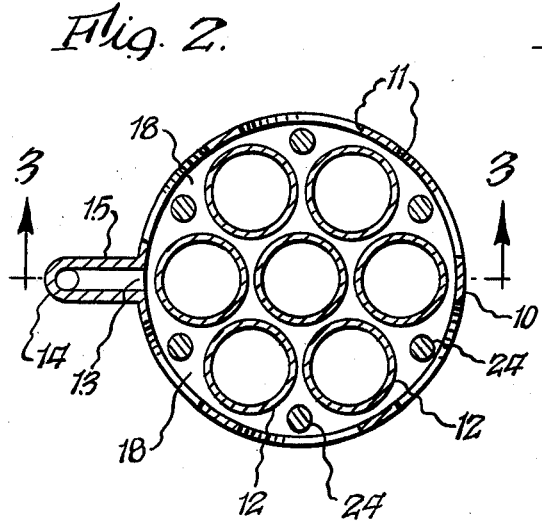
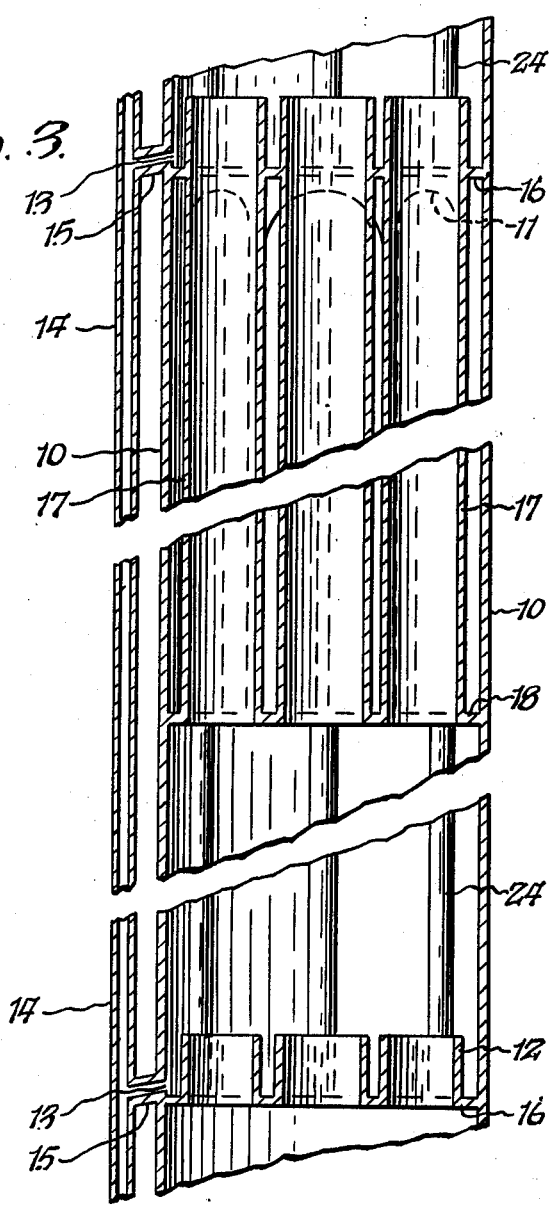

ATMOSPHERIC EFFECTS STILL

This invention relates to a vertical still structure, the purpose of which basically is to desalinate and de-mineralize water which, because of saturation by salts, minerals or other impurities, is unfit for either human consumption or other uses where pure water is required, such as for purposes of irrigation for example.

The general object of this invention is to provide a means of separating impurities in a body of contaminated water by a method using only existing atmospheric conditions and the sun's energy without the need of providing high cost fuels, artificial means of energy, or the need of constant supervision to bring about such separation.

Another object is to provide a structure which, after erection, will provide a constant supply of pure water in areas which, because of location, distance, or terrain, make delivery or other methods of providing pure water expensive or impractical.

A further object is to provide a still structure of sufficient height to take advantage of the change of temperature as altitude is increased.

A further object is to provide a still structure having around its base, a canopy of transparent or translucent material which will allow solar rays to heat impure water underneath, causing evaporation and allowing the heated high moisture-content air to be carried up through the structure by natural draft through tubes incorporated in the structure. The tubes are exposed to the atmosphere such that cooler temperatures may condense the water vapor and cause it to collect upon the interior surfaces of the tubes and structure walls. The condensed droplets fall, down to collection basins, from which a flow thereof is diverted through an adjoining drain pipe on the exterior surface of the structure, down to the surface or base of the structure where it can be stored in holding tanks or reservoirs until ready for use.

A further object is to provide a structure which may be erected at a site where an abundant supply of impure water is present, as at a seashore for example, or in a tropic area where sea level temperature is consistently high. In this latter environment, the high temperatures increase the efficiency of the structure in evaporating a high percentage of water, thereby leaving a highly concentrated brine which, when processed by presently known means, may enable the recovery of various salts and minerals.

Still another object is to provide a structure which, in addition to providing water and other benefits, may provide a means of increasing the moisture content of the atmosphere. This would be accomplished by decreasing the efficiency of the structure which would allow a considerable amount of water vapor to escape with the exhausted heated air, thus benefiting surrounding arid regions by increasing the annual moisture falling to the ground as dew or rain in the immediate area of the still structure.

These and other objects and advantages of the present invention will be fully apparent from the following description and the attached drawings.

BRIEF DESCRIPTION OF THE DRAWING

FIG. 2 is an enlarged horizontal sectional view thereof, taken generally on line 2—2 of FIG. 1

FIG. 3 is a further enlarged fragmentary vertical sectional view thereof, taken generally on line 3—3 of FIG. 2

DESCRIPTION OF THE PREFERRED EMBODIMENT

Figure 1:
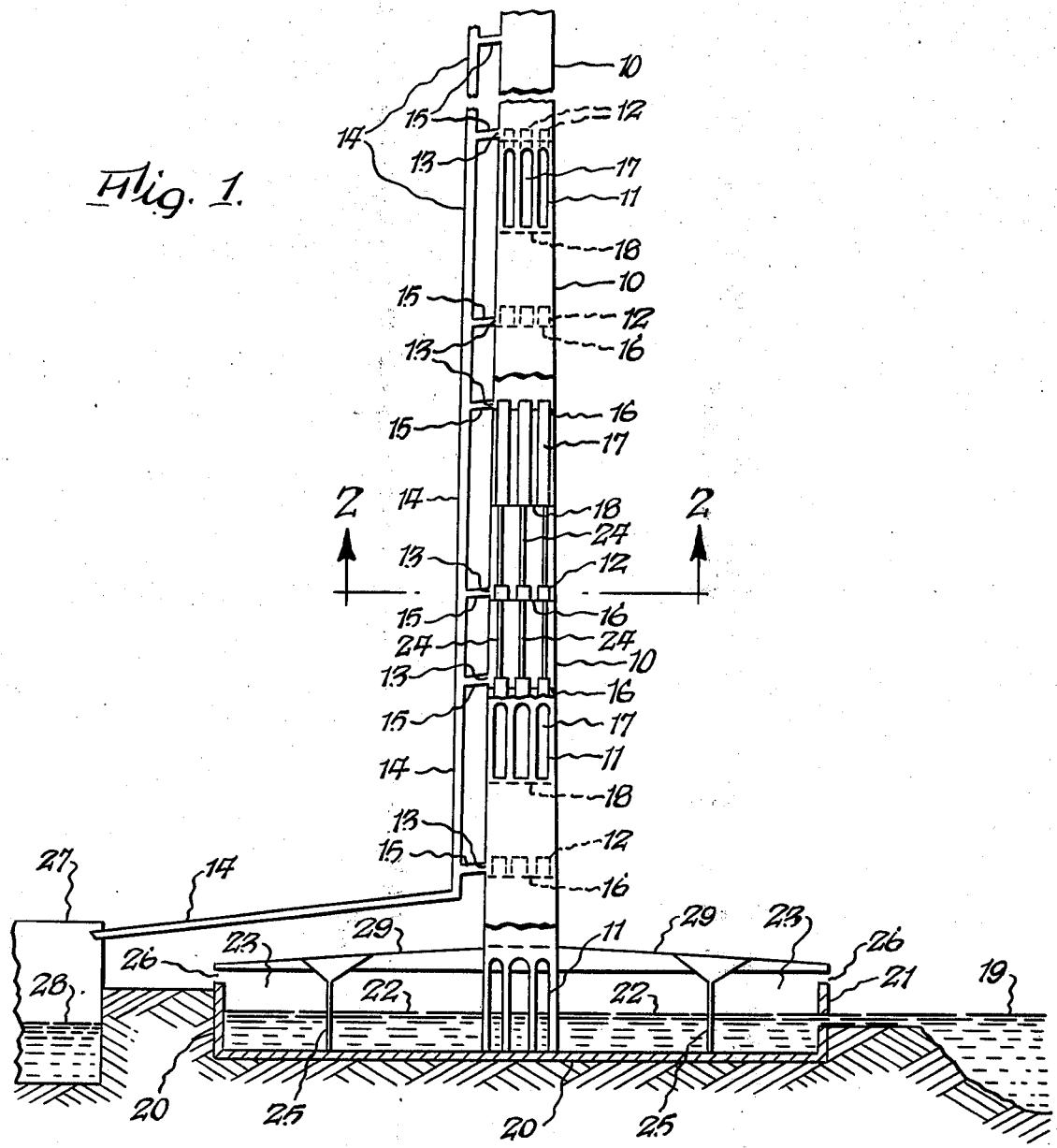
FIG. 1 is a side elevation of the still, with parts of the exterior shell cut away to expose the inner tubes and the collector plates in vertical section.

Refferring in greater detail to the drawings, in which like numerals indicate like parts throughout the several views, the atmospheric effects still of the present invention comprises a vertical structure having an exterior shell, indicated generally by numeral 10, provided with openings, generally indicated by numeral 11, at the top, side and bottom communicating with atmosphere. This still is situated in a pool of contaminated water, indicated generally by the numeral 22, enclosed by earthen or concrete sides and bottom, indicated generally by numeral 21, leading to a supply source of contaminated water, indicated generally by the numeral 19, such as the ocean for example. The still is covered by a transparent or translucent canopy, indicated generally by the numeral 29, attached to the structure shell 10 and further supported at its extremities by upright pillars, indicated generally by the numeral 25. The canopy 29 covers the evaporation area, indicated generally by numeral 23, situated between the surface of the pool of contaminated water 22 and the canopy 29, and defines an opening, indicated generally by numeral 26, to the atmosphere between the upright wall of pool enclosure 20 and canopy 29.

Air entering opening 26 by natural draft created by the upright structure of the present invention, draws with it high humidity air from the evaporation area 23, which is heated by solar rays which are allowed to pass through canopy 29, thence passes through bottom openings 11 in shell 10 rises up into and through a plurality of short tubes, generally indicated by numeral 12, open at both ends and positioned at a right angle to collector plates, indicated generally by numeral 16. Upper portions of tubes 12, side walls of shell 10, and the tops of collector plates 16 form a collection basin having an opening, generally indicated by numeral 13, through shell 10, leading to a drain tube, indicated generally by numeral 15, connected to a main drain pipe, indicated generally by numeral 14.

The heated, moisture-laden air begins to give up a portion of its water content due to the throttling effect created by collector plate 16 and short tubes 12. This moisture-laden air condenses on the interior surface walls of shell 10 and on a plurality of condensation bars, indicated generally by numeral 24, running parallel to shell 10, which function to increase condensation areas. The constantly rising high-humidity air then passes through a plurality of condenser tubes, indicated generally by the numeral 17, passing through a closure plate, indicated generally by numeral 18, and through a second collector plate 16. The upper ends of tubes 17, the interior walls of shell 10, and the top of collector plate 16 form a second collection basin having an opening 13 through shell 10 to drain tube 15, thence to drain pipe 14. The exterior walls of condenser tubes 17 are exposed to the atmosphere between closure plate 18 and collector plate 16 by means of side openings 11 in shell 10. The lower atmospheric temperature condenses a further portion of water from the rising air. The condensed water collecting on the inner walls of condenser tubes 17 drops to a collection basin formed by collector plate 16, side walls of shell 10, and tubes 12, and then flows through the opening in shell 13, through drain tube 15 and drain pipe 14 a holding tank or reservoir, indicated generally by the numeral 27. The condensed water in this reservoir is indicated generally by numeral 28. The rising moisture-laden air is subjected to a plurality of the combinations of short tubes 12, collector plates 16, and condenser tubes 17 until finally exhausting to the upper atmosphere through the open top 11, where the remaining water vapor in the heated air turns to clouds or condenses immediately falling to the ground as dew or rain, thus increasing the humidity and rainfall in the general area or vicinity of the structure.

It can be seen that the present invention provides a means of distilling contaminated water, using only the sun's heat energy and differances of temperature and pressure in the atmosphere due to altitude without the requirement of human supervision, thus providing a constant source or pure water daily all year long.

What is claimed is:

1. An atmospheric effects still, comprising:

a fluid holding tank provided with a supply opening;

a top cover of translucent material supported above said tank in vertically-spaced relation thereto; and a vertically-positioned tapered hollow tower member having an outer shell, having its base positioned on the floor of said tank, and having an intermediate portion of its vertical extent penetrating said cover, said shell having openings adjacent said base to permit fluid in said tank to enter said tower member, said tower member also having a plurality of vertically-spaced sections of decreasing cross-sectional area, each of said sections including a lower horizontal closure plate, an upper horizontal closure plate, and a plurality of vertically-positioned open tubes having their outer surfaces exposed to atmospheric temperature, each of said tubes having its lower end arranged to penetrate said closure plate and having a marginal portion adjacent its upper end extending beyond said upper collector plate to define a liquid trap chamber above said collector plate, said tower member also having a drain arranged to direct a flow of condensed water accumulating on said collector plates away from said tower member, and a plurality of vertically-disposed condenser tubes arranged in said tower member;

whereby solar energy may pass through said top cover to heat fluid in said tank, to cause heated moisture-laden air to rise upwardly through said tower member, and to cause water to condense within said tubes and on said condenser tubes and flow from said tower member through said drain.

* * * * *